June 21, 1955  A. J. WOODS  2,711,044
ILLUMINATED LURE
Filed July 31, 1952  2 Sheets-Sheet 1

Albert J. Woods
INVENTOR.

June 21, 1955  A. J. WOODS  2,711,044
ILLUMINATED LURE

Filed July 31, 1952  2 Sheets-Sheet 2

Albert J. Woods
*INVENTOR.*

United States Patent Office 2,711,044
Patented June 21, 1955

2,711,044

ILLUMINATED LURE

Albert J. Woods, Pueblo, Colo.

Application July 31, 1952, Serial No. 301,843

2 Claims. (Cl. 43—17.6)

The present invention relates to fishing apparatus, and more particularly relates to a reel specifically constructed for carrying an electric wire as a fishing line and an electrically illuminated lure for use therewith.

A primary object of the invention is to provide a fishing apparatus comprising a reel, electricity conducting fishing line and electrically illuminated lure which is so constructed and arranged that upon winding of the reel, the lure will be intermittently illuminated to simulate a lightning bug or the like.

Another object of the invention is to provide a novel fishing reel construction being constructed specifically to carry an electricity conducted fishing line with a plug-in socket for connecting a source of electricity to the fishing line.

Yet another object of the invention is to provide a fishing reel according to the preceding object which is arranged to intermittently energize the fishing line as the reel is wound or unwound.

An important object of the invention is to provide a novel, electrically illuminated lure that is simple in construction, dependable in use, and efficient in operation.

A still further object of the invention is to provide a lure of the above-mentioned character that is comprised of separable sections and which includes a novel means for attaching hooks thereto.

These, together with various ancillary objects and features of the invention which will become apparent as the following description proceeds, are attained by the present invention, a preferred embodiment of which is shown by example only in the accompanying drawings, wherein.

Figure 1:
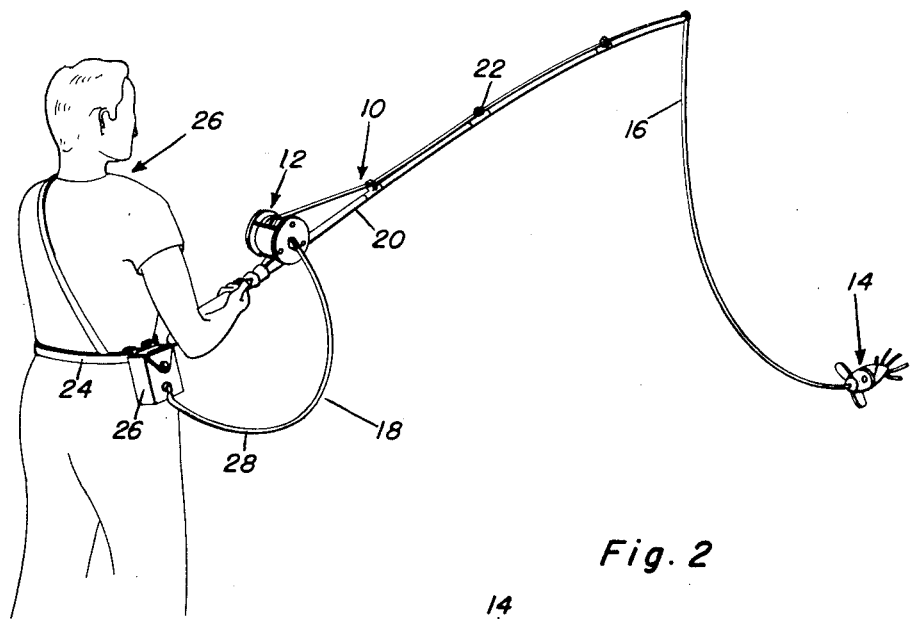
Figure 1 is a perspective view of the fishing apparatus in its entirety in operative position.

Referring now to the accompanying drawings in detail wherein like reference characters are utilized to designate like parts throughout the various views, attention is first directed to Figure 1 wherein the fishing apparatus is shown in its entirety and is designated generally by the numeral 10.

The fishing apparatus 10 comprises a reel 12, a fishing lure 14, an electricity conducting fishing line 16 wound upon the reel 12 and a source of electricity 18 energizing the fishing line 16 through the reel 12.

As shown in this figure, the reel 12 is mounted on a conventional fishing rod 20 with the line 16 guided through the eyes 22 of the rod. Secured to the belt 24 of an individual 26 holding the fishing rod 20 is a battery case 26 in which batteries (not shown) are disposed. A lead 28 extends from the battery casing 26 to the reel 12. It is to be noted that this illustration in Figure 1 is for purposes of example only, since it is obvious that the reel and line need not be mounted on a rod, the battery casing 26 may be dispensed with and the batteries supported in any convenient spot whether on a boat, dock or ground surface.

Figure 4:
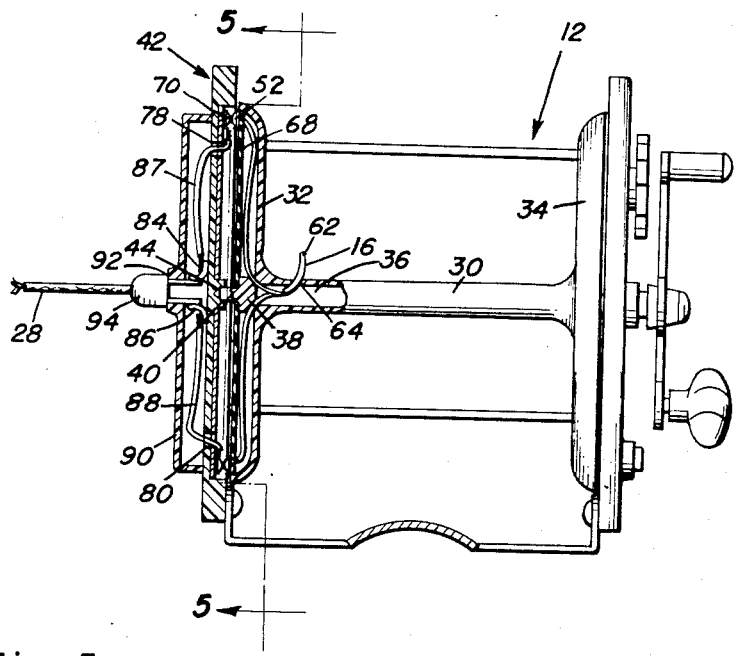
Figure 4 is a front elevational view of the fishing reel with certain parts being shown in section to show the electrical connection between the electricity conducting fishing line wound upon the reel and the source of electric current.
Figure 5:
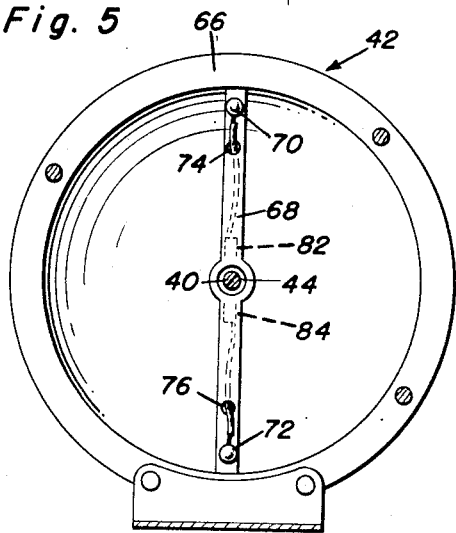
Figure 5 is an end view of the fishing reel taken substantially along the section line 5—5 of Figure 4; and, Figure 6 is a perspective view of the end of the reel to which the fishing line is attached.
Figure 6:
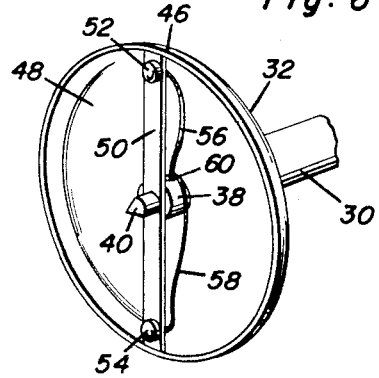

Referring now to Figures 4–6, the construction of the reel 12 will be readily apparent. The reel 12 comprises generally a hollow spindle 30 having flanged ends 32 and 34 respectively. The construction of the spindle 30 is preferably of hard rubber or plastic, but may be of other well known insulating materials. Secured to the flanged end 32 at the center thereof and closing the opening to the hollow interior 36 of the hollow spindle 30 is a pin 38 having a reduced end 40. An end or closure plate 42, having an inwardly extending countersunk portion 44 closes the flanged end 32. The reduced end 40 of the pin 38 is rotatably journaled in the countersunk portion 44 of the end plate 42 so that the reel spindle 30 may rotate freely with respect to the end or closure plate 42.

Referring now to Figure 6, the details of construction of the end flange 32 and the connection of the electricity conducting fishing line 16 thereto can be readily observed. The end flange 32 is formed with a rim 46 extending annularly therearound to form a recessed or dished portion 48. Mounted within the dished portion 48 of the end flange 32 is a diametrically extending, flat strip 50 of insulating material which is secured at its central portion to the pin 38 for rotation therewith. At the ends of the strip 50 are provided contact brushes or plates 52 and 54, respectively. As will be seen from this figure, the fishing line 16 comprises two wires 56 and 58 which terminate at one set of their ends to the contact brushes 52 and 54, respectively. From the contact brushes 52 and 54, the wires 56 and 58 converge toward one another and pass through the opening 60 in the pin 38 and into a common insulating sheath 62 which extends through an opening 64 in the hollow spindle 30. These wires are preferably of soft copper construction while the insulation sheath 64 is of waterproof material. Thus, it can be seen that the sheath 64 and the copper wires 56 and 58 comprise the electricity conducting fishing line 16.

As shown, the end plate 42 comprises a circular disk having a peripheral flange 66 being disposed toward the rim 46 of the end flange 32. On the inner surface of the end plate 42 and facing the recessed portion 48 of the flanged end 32 is a diametrically extending insulating strip 68 which is fixedly secured intermediate its ends to the raised portion of the end plate 42 forming the countersink 44. At opposite ends of the strip 68, contact brushes or plates 70 and 72 are secured which are the same radial distance from the reduced end 40 of the pin 38 as are the contact brushes 52 and 54 secured to the flanged end 32 of the spindle 30. Thus, it can be seen that as the spindle 30 is rotated, the brushes 52 and 54 will intermittently and simultaneously contact the brushes 70 and 72. Apertures 74 and 76 are formed in the strip 68 adjacent each of the contact brushes 70 and 72. Aligned apertures 78 and 80 are formed in the wall of the end plate 42. Mounted on the outer surface of the end plate 42 at the central portion thereof are a pair of spaced, metal plates, preferably having some natural resilience. These plates are designated by the numerals 84 and 86, respectively. A lead wire 87 is secured at one end to the spring arm or plate 84, extends through aligned apertures 74 and 78 and is connected at its other end to the contact brush 70. A similar wire 88 is connected at one end to the spring arm or plate 86, extends through aligned apertures 76 and 80 and is connected at its other end to the brush 72. A cap 90 is secured to the outer surface of end plate 42 and encloses the spring arms and lead wires therein to protect the same and also to protect the user of the reel from the same.

An opening 92 is formed centrally in the cap 90 to afford communication with the spring arms 84 and 86. By this construction, a female plug-in socket is formed by opening 92 and plates 84, 86. Conductor 28, leading from the batteries or other electrical source, has a male plug 94 at the end thereof disposed in the female socket formed by 92, 84 and 86.

Figure 3:
Figure 3 is a diagrammatic illustration of the wiring circuit of the fishing apparatus.

From the diagrammatic wiring circuit shown in Figure 3, the energization of the fishing line is carried out as follows. From a battery, illustrated diagrammatically as at 96, current flows through the brushes 70, 52 and 72, 54 through the wires 56 and 58 to the lure 14.

Figure 2:
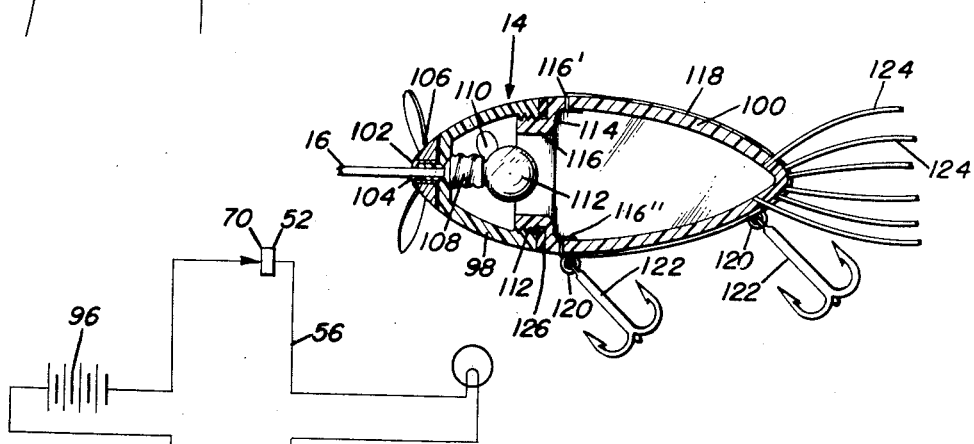
Figure 2 is a longitudinal sectional view of the electrically illuminated fishing lure, portions being shown complete.

Referring now more particularly to Figure 2, the construction of the lure 14 will be described. The lure 14 comprises a hollow body formed of front and rear sections 98 and 100, respectively. The front section 98 comprises a hollow, substantially conical-shaped member having an opening 102 in its apex and having a cylindrical sleeve 104 surrounding the opening 102. Rotatably journaled on the cylindrical sleeve 104 is a spinner 106 and extending through the aperture 102 is the end of fishing line 16. Mounted on the inner surface of the front section 98, adjacent the apex thereof, is a light bulb socket 108 which is electrically connected to the fishing line 16 in the manner shown in the diagrammatic sketch of Figure 3. Openings 110 (only one of which is shown) are formed in opposite sides of the front section wall to provide eyes for the lure which are adapted to be illuminated upon energization of the light bulb 113 screwed into the socket 108. The rearward end of the front section 98 is open and the inner surface of the cone wall is cylindrically formed at this point and is threaded as at 112.

The rear section 100 of the lure 14 is of substantially the same conical construction as is the front section 98 being, however, in slightly more elongated form. The front end of the rear section 100 is formed with an inwardly extending annular shoulder 114, from the inner ends of which projects a cylindrical externally threaded sleeve 116. The sleeve 116 is threaded into the cylindrical threaded surface 112 of the front section 98 whereby the front and rear sections are detachably secured to one another. It is to be noted that the sleeve section 116 of the rear section 100 of the lure 14 affords free communication with the hollow interior of the front section 98. It is contemplated that the rear section 100 will be of a translucent plastic or other material whereby illumination from the light bulb 113 will cause the rear section 100 to glow.

Adjacent the forward end thereof, rear section 100 is formed with a pair of diametrically opposed openings 116'. A U-shaped strap 118 has its ends 116'' extending through these openings while the body of the strap 118 closely overlies and follows the contour of the outer surface of the rear section 100. Eyes 120 are mounted spacedly along the strap 118 and hooks 122 are pivotally mounted in these eyes. Flexible wrigglers or weavers 124 extend from the rear end of the rear section 100 to impart a life-like motion to the lure.

To assure a watertight fit between the front section 98 and the rear section 100 of the lure 14, a sealing gasket 126 surrounds the offset shoulder 114 of the rear section 100 and sealingly abuts the rear end of the front section 98 when the rear section 100 is screwed thereinto.

From the above explanation, the construction and operation of the fishing apparatus of the invention is believed to be clearly apparent and further description is believed to be unnecessary. However, since numerous modifications and changes will readily occur to those skilled in the art after a perusal of the foregoing specification taken in conjunction with the accompanying drawings, it is not desired to limit the invention to the exact construction shown and described; but, all suitable modifications may be resorted to falling within the scope of the appended claims.

Having thus described the invention, what is claimed as new is:

1. A fishing reel comprising a hollow spindle, disk-shaped ends on said spindle, a pair of diametrically spaced electric contact brushes mounted on one of said ends, a closure plate closing said one end and being fixed against rotation with respect to said spindle, contact brushes mounted on said closure plate in diametrically opposed relation to one another and being disposed along the same circumference as said end contact brushes, said end contact brushes and said closure plate contact brushes intermittently contacting one another as the reel is wound, conducting members extending radially toward one another from said closure plate brushes and terminating short of each other and a cap mounted on said closure plate and enclosing said conducting members, said cap having an aperture in the center thereof communicating with the terminals of said conducting members, said aperture and said terminals constituting a plug-in socket.

2. In a fishing apparatus, a reel including a spindle having end flanges thereon, one of said end flanges being dished and providing an outwardly opening recess, an insulated strip extending diametrically across said recess, electric contacts on the ends of said strip, an electric wire comprising a pair of conductive elements wound on said reel spindle, a lure secured to the end of said wire and adapted to be illuminated, said spindle having a passage therethrough opening into said recess, said wire having its other end extending through said passage and opening into said recess, said conductive elements being attached to said contacts, a closure plate closing said recess and being fixed with respect to said reel rotation, fixed contacts on said closure plate, a female socket in said closure plate, wires leading from said socket to said fixed contacts, a battery and electrical leads from said battery terminating in a male plug, said male plug being releasably seated in said socket and establishing intermittent contact between said battery and said lure as the reel is rotated.

References Cited in the file of this patent

UNITED STATES PATENTS

| | | |
|---|---|---|
| 1,018,599 | Woods | Feb. 27, 1912 |
| 1,079,891 | Simms | Nov. 25, 1913 |
| 1,159,278 | Sampey | Nov. 2, 1915 |
| 1,754,072 | Watts | Apr. 8, 1930 |
| 2,002,135 | Barton | May 21, 1935 |
| 2,145,929 | Herman | Feb. 7, 1939 |
| 2,279,605 | Welsh | Apr. 14, 1942 |
| 2,457,075 | Williams | Dec. 21, 1948 |
| 2,585,070 | Allard | Feb. 12, 1952 |
| 2,587,788 | Tacy | Mar. 4, 1952 |
| 2,599,099 | Folker | June 3, 1952 |
| 2,606,979 | Ringstad | Aug. 12, 1952 |
| 2,655,757 | Boyce | Oct. 20, 1953 |